F. P. THIEN.
BAKING PAN.
APPLICATION FILED APR. 18, 1910.

981,717.

Patented Jan. 17, 1911.

Witnesses:
C. B. Knudsen
A. G. Peterson

Inventor:
Frank P. Thien,
By Michael J. Stark & Sons
Attorneys.

UNITED STATES PATENT OFFICE.

FRANK P. THIEN, OF CHICAGO, ILLINOIS.

BAKING-PAN.

981,717.  Specification of Letters Patent.  Patented Jan. 17, 1911.

Application filed April 18, 1910.  Serial No. 555,991.

*To all whom it may concern:*

Be it known that I, FRANK P. THIEN, a citizen of the United States, and resident of Chicago, in the county of Cook and State of Illinois, have invented certain new and useful Improvements in Baking-Pans; and I do hereby declare that the following description of my said invention, taken in connection with the accompanying sheet of drawings, forms a full, clear, and exact specification, which will enable others skilled in the art to which it appertains to make and use the same.

This invention has general reference to baking pans, and especially that class of baking pans employed in bakeries for baking bread; and it consists, essentially, in the novel and peculiar combination of parts and details of construction, as hereinafter first fully set forth and described, and then pointed out in the claims.

The object of this invention is the production of an efficient, serviceable, and very durable baker's bread pan, that can be manufactured at reasonable cost without the employment of expensive machinery.

It comprises, in combination, with a set of pans, usually four, reinforcing plates at the outer sides of the two outer end-pans, which are adapted to protect these sides and which are sufficiently resilient to protect these sides from injury by the baker's peel used in removing the pans from the bake oven.

Figure 1:
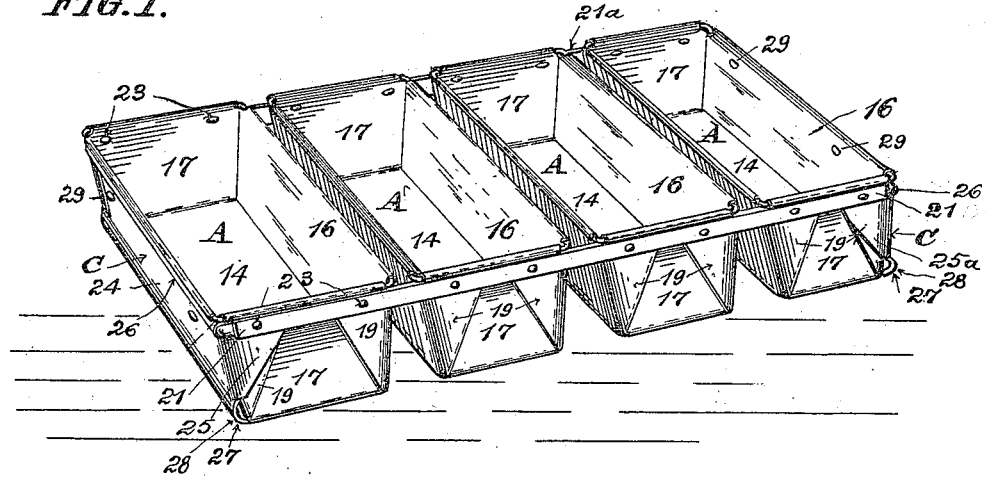
Figure 2:
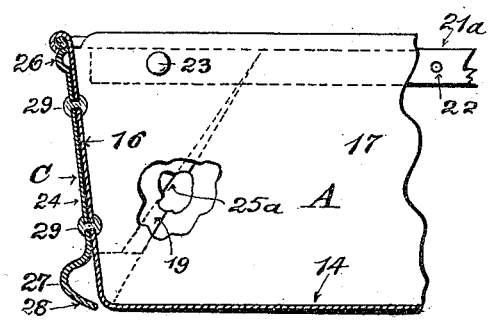
Figure 3:
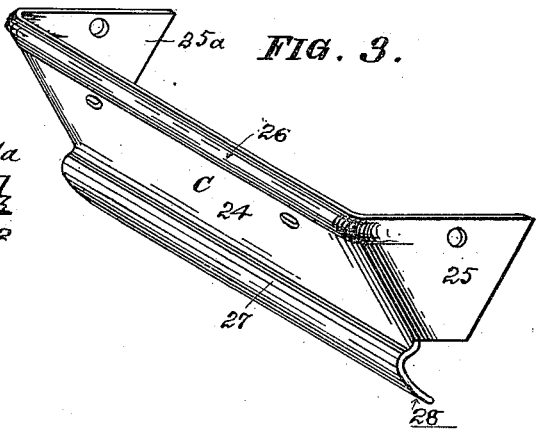

In the drawings already mentioned, which serve to illustrate this invention more fully, Figure 1 is a perspective view of a set of baker's bread pans embodying my improvements. Fig. 2 is a transverse sectional elevation of a portion of the outer pan of a set. Fig. 3 is a perspective view of the reinforcing plate detached.

Like parts are designated by corresponding symbols and characters of reference in all the figures.

This baker's bread pan comprises a set of rectangular pans A, usually four, which are placed in spaced relation one to the other, to permit heat to act upon the sides of the pans in order to attain even baking of the bread. Each of these pans is formed briefly described comprises a bottom 14, longitudinal sides 16, and ends 17, there being at the ends overlapping folds 19, which tend to strengthen the pan at the corners.

A series of the pans described are connected together in spaced relation one to the other, by band iron straps 21, 21$^a$, said straps being perforated at suitable intervals by rivetholes 22, Fig. 2, through which, and similar perforations at the overlapping portions at the ends of said pans, rivets 23, are passed to securely fasten the pans to these straps.

Upon the outer sides of the outermost pans I locate reinforcing plates C, one of which is shown in detail in Fig. 3, and which comprises a body portion 24, of sufficient length and width to approximately cover the side of a pan, and two angular end-members 25, 25$^a$, which latter members are bent at right angles to the body portion and overlap the laps at the ends of the pan and are secured thereto by the same rivets 23 which are at the ends of said pans. The upper longitudinal edge of the body portion 24 is curled or beaded at 26, which bead reaches over part of the end members and stiffens the upper longitudinal edges of these parts. The lower edge of the body portion is also beaded with a preferably wider bead 27, which latter bead stops short of the side of the outer pan, said lower portion of the reinforcing plate being resilient so that when the baker's peel employed in lifting the pan out of the baker's oven strikes the side of the outermost pan, the resilient portion of the reinforcing plate will, in part, absorb the shock while at the same time the lower curved portion 28 of the bead 27 assists the peel in passing underneath the pan.

The reinforcing plates are preferably made from somewhat heavier material than the pans to make them sufficiently strong to prevent indenting the outer side of the outermost pans should the peel strike the side of the pan above the bottom thereof. The plates are, in addition to being riveted at the ends of the pans further riveted at the side of the same at 29, as shown in Figs. 1 and 2.

Having thus fully described this invention, I claim as new and desire to secure to me by Letters Patent of the United States—

1. A baker's bread-baking pan, comprising a series of jointed pans, there being laps at the corners of the ends of said pans, and reinforcing plates on the outer sides of the outermost pans, each of said reinforcing plates comprising a body portion and two end portions, said body portion having an outwardly curled or beaded portion at its upper longitudinal edge and a further, larger, bead at the lower longitudinal edge said lower longitudinal edge being in spaced relation to the side of said pan, said reinforcing plate being secured to the ends and the outer side of the outermost pans.

2. In a baker's bread-baking pan, a reinforcing plate for the outer side of said pan, said reinforcing plate comprising a body portion of substantially the size of the side of said pan, and two end-portions at right angles to said body portion, there being at the upper longitudinal edge of said body portion an outwardly-curled or beaded portion, and at the lower longitudinal edge a resilient member, said plate being adapted for attachment to the side and the ends of said pan.

In testimony that I claim the foregoing as my invention, I have hereunto set my hand in the presence of two subscribing witnesses.

FRANK P. THIEN.

Witnesses:
MICHAEL J. STARK,
A. G. PETERSON.